(12) United States Patent
Ortiz et al.

(10) Patent No.: US 7,272,476 B2
(45) Date of Patent: Sep. 18, 2007

(54) UNIVERSAL AUTOMOTIVE MAINTENANCE COMPONENT CONTROLLER APPARATUS

(75) Inventors: David L Ortiz, Glendale, AZ (US); Mark A. Davis, Green Valley, AZ (US); Charles M. Sulik, Tucson, AZ (US); Arun Raj Pandey, Tucson, AZ (US); James R. Newton, Tucson, AZ (US)

(73) Assignee: Environmental Systems Products Holdings Inc., East Granby, CT (US)

( * ) Notice: Subject to any disclaimer, the term of this patent is extended or adjusted under 35 U.S.C. 154(b) by 0 days.

(21) Appl. No.: 11/266,234

(22) Filed: Nov. 4, 2005

(65) Prior Publication Data

US 2006/0178792 A1 Aug. 10, 2006

Related U.S. Application Data

(60) Provisional application No. 60/625,107, filed on Nov. 5, 2004.

(51) Int. Cl.
*G01M 17/00* (2006.01)

(52) U.S. Cl. .............................. 701/33; 701/29; 73/117; 73/862.28

(58) Field of Classification Search ...................... None
See application file for complete search history.

(56) References Cited

U.S. PATENT DOCUMENTS

| | | | | |
|---|---|---|---|---|
| 5,005,405 A | | 4/1991 | Ishizeki ........................ 73/123 |
| 5,111,402 A | * | 5/1992 | Brooks et al. ................. 701/35 |
| 5,193,062 A | | 3/1993 | Murase et al. ......... 364/426.04 |
| 5,270,628 A | | 12/1993 | Noguchi et al. ............. 318/587 |
| 5,394,743 A | | 3/1995 | Noguchi et al. ............... 73/117 |
| 5,396,792 A | | 3/1995 | Kohsaka et al. ............... 73/117 |
| 5,450,748 A | | 9/1995 | Evans et al. ................... 73/117 |
| 5,542,290 A | | 8/1996 | Suzuki ......................... 73/117 |

(Continued)

FOREIGN PATENT DOCUMENTS

WO WO2004/038590 A1 * 5/2004

OTHER PUBLICATIONS

"MD-7000 Control Software with Virtual Inertia™ Technology", Mustang Dynamometer, © 2000, 12 pages.

*Primary Examiner*—Michael J. Zanelli
(74) *Attorney, Agent, or Firm*—Pillsbury Winthrop Shaw Pittman, LLP (57) ABSTRACT

A computer-implemented universal automotive maintenance component controller apparatus that may be used as common core enabling a user to interface with, control, and analyze data from, various modular automotive maintenance or diagnostic equipment and/or components regardless of the type or manufacturer of the component. The universal controller of the invention may include a processor and a control application, the control application including one or more software modules that enable the processor to control one or more connected automotive maintenance components. The universal controller may also include one or more component interfaces operatively connected to the processor, wherein each of the one or more component interfaces is configured for one of the plurality of automotive maintenance components. Each of the one or more component interfaces may also include one or more component modules specific to one of the plurality of automotive maintenance components and a port for operatively connecting one of the plurality of automotive maintenance components to the apparatus.

8 Claims, 7 Drawing Sheets

U.S. PATENT DOCUMENTS

| | | | |
|---|---|---|---|
| 5,708,215 A | 1/1998 | Bull | 73/862.29 |
| 5,717,595 A * | 2/1998 | Cherrington et al. | 705/400 |
| 5,884,202 A * | 3/1999 | Arjomand | 701/29 |
| 5,973,274 A | 10/1999 | Zarchy | 177/132 |
| 6,006,611 A | 12/1999 | Galvin et al. | 73/862.16 |
| 6,157,878 A | 12/2000 | Suzuki | 701/29 |
| 6,247,357 B1 | 6/2001 | Clayton, Jr. et al. | 73/117 |
| 6,282,469 B1 * | 8/2001 | Rogers et al. | 701/29 |
| 6,345,542 B1 | 2/2002 | Suzuki et al. | 73/862.09 |
| 6,360,591 B1 | 3/2002 | Carley | 73/117 |
| 6,457,351 B1 | 10/2002 | Yamamoto | 73/116 |
| 6,564,128 B2 * | 5/2003 | Baird et al. | 701/33 |
| 2002/0112042 A1 * | 8/2002 | Coburn | 709/223 |
| 2004/0000191 A1 | 1/2004 | Ben-David | 73/118.1 |

\* cited by examiner

UNIVERSAL AUTOMOTIVE MAINTENANCE COMPONENT CONTROLLER APPARATUS

RELATED APPLICATIONS

This application claims priority to U.S. Provisional Patent Application Ser. No. 60/625,107, filed Nov. 5, 2004, which is hereby incorporated by reference herein in its entirety.

FIELD OF THE INVENTION

The invention relates to a computer-implemented universal automotive maintenance component controller system for controlling modular hardware and/or software components utilized for performing various diagnostic, performance, safety and/or repair-oriented tasks in an automotive environment.

BACKGROUND

The automotive service industry has quickly become a complex, information-laden landscape. The integration of computer technology into nearly every aspect of automobile manufacturing and design has forced automotive service providers to update their toolbox with the latest in high-tech diagnostic and repair equipment. As such, the typical service station has become littered with numerous computer screens and costly CPUs, each performing different tasks.

Training personnel in the operation of each of these numerous devices, often provided by a broad range of manufacturers, may also prove costly for the average automotive service provider. Additionally, with the speedy advancement of automotive and computer technology, the state of the art in maintenance and diagnostic devices changes on an almost yearly basis, adding more costs to service providers performing automobile diagnosis and repair. These and other challenges face automotive service providers.

SUMMARY

The invention relates to a computer-implemented universal automotive maintenance component controller system (hereinafter "universal controller") for controlling modular hardware and/or software components utilized for performing various diagnostic, performance, safety, and/or repair-oriented tasks in an automotive environment. These tasks may include diagnostic or repair work relating to a vehicle's emissions, weight, sideslip, suspension, brakes, speedometer, headlights, engine, fuel economy, odometer, fuel tank, gas cap, on-board-diagnostic system, alignment, noise output, or other vehicle element. As part of this system, the universal controller may serve as a common core that enables a user to interface with and control various modular automotive maintenance or diagnostic equipment/components (hereinafter "automotive maintenance components" or "components") for performing one or more of the aforementioned tasks, and for analyzing data acquired during performance of those tasks. The universal controller may be compatible with maintenance or diagnostic components regardless of the type or manufacturer of the component.

The universal controller may, in one implementation, control multiple types of light-duty vehicle (including light truck) and/or heavy-duty vehicle maintenance or diagnostic components in either a centralized or de-centralized vehicle testing environment. The universal controller may serve as an interface between its own test system computer and multiple vendor's diagnostic, performance, safety, or repair components in a test lane, garage bay, open-air test area, or other automotive maintenance environment. The universal controller may integrate with a facility's existing components or may be used in programs requiring new component installations. Furthermore, the universal controller may be designed to receive BAR97 (California Department of Consumer Affairs Bureau of Automotive Repair 1997 Emissions Inspection System Specification) technical certification, ETL/UL (Electrical Testing Laboratories, Inc./Underwriter's Limited) electrical certification, and/or other certification.

According to an aspect of the invention, the universal controller may include a processor. The processor may be operatively connected to one or more component interfaces. The operative connection between the processor and the one or more component interfaces may include, for instance, an attachment with a central processing unit (CPU) board according to a stackable PC104 configuration. Other connections and configurations may be used.

A component interface may include an application board (e.g., daughter board) and an accompanying port. Application board peripherals may be mapped in I/O. In one embodiment, each application board may include software, firmware, and/or hardware elements specific to a particular type and/or brand of component including, for example, any modules (e.g., software, firmware, or other modules) necessary to operate the specific component, a memory device, and/or other elements. Furthermore, application boards may identify the specific manufacturer and type of component to the processor of the universal controller. A port may include, for instance, a serial device interface such as a universal serial bus (USB) port. Other types of ports for establishing operative connections between processors and components may be utilized. Operative connections between the one or more component interfaces and components may include, for example, quick disconnect locking connectors. Other connectors may be used.

The one or more component interfaces may enable operative connections with one or more components. One or more components may include any computer-implemented equipment, now existing or hereafter developed, for the performance of automotive diagnostics, performance, safety, and/or repair tasks. As recited above, such tasks may include emissions testing, vehicle weighing, sideslip testing, suspension testing, brake testing, speedometer testing, headlight testing, engine testing, fuel economy testing, fuel tank testing, gas cap testing, on-board-diagnostic (OBD) testing, alignment testing, noise testing, visual vehicle inspection, or any other automotive maintenance task that is, or can be, tested using computer-implemented equipment. One or more components may be compatible with the universal controller regardless of its type or manufacturer.

The universal controller may include a control application, which may comprise one or more software modules that enable a user to interface with and control the universal controller and components operatively connected to the universal controller. The control application may also include one or more software modules for the receipt and analysis of data returned by one or more components. The control application and one or more software modules may be flexible such that the compliment of controlled components may be changed without radical alteration of the controller (other than the need to add an application board specific to any new equipment) or effect to the overall functionality of the controller. Furthermore, the control application may include a comprehensive compliment of modules to enable use in any given national or product market.

According to an aspect of the invention, one or more users may access the universal controller through an interface. The interface may include a graphical user interface presented to a user on a display device. A user may interact with the graphical user interface via a user input device. In one embodiment, the display device may be or include, for instance, a display screen such as an LCD screen. A user input device may be or include, for instance, a digital keypad with various keys, including arrow keys, alphanumeric keys, an enter key or other keys. The display screen may enable the display of menus, which a user may scroll through and select from using the digital keypad. The keypad and display screen may also enable the input of instructions, words, numbers, or other data.

According to another aspect of the invention, the graphical user interface may comprise interfaces enabled by known computer operating systems such as, for instance, Microsoft Windows, Linux, DOS, or other real-time operating systems. In this implementation, a display device may comprise, for instance, a VGA computer monitor, multi-colored LCD screen, or other display device capable of presenting visual data to a user. In this implementation, a user input device may include a standard "QWERTY" computer keyboard, a mouse, a touch screen, or other data input device.

According to one aspect of the invention, the universal controller may include one or more communications ports (e.g., serial, Ethernet, wireless, etc.) enabling operative connection to an alternative control device or a wireless alternative control device ("wireless device"). Both the alternative control device and the wireless device may enable a user to remotely control components or exchange data/instructions with the universal controller over a network. Furthermore, both the alternative control device and the wireless device may support a graphical user interface and may perform the functions of a display device and a user input device.

According to one aspect of the invention, the universal controller may perform automated software module updates. For example, upon release of a new software module, the new software module may be transmitted to the universal controller via the communication port and a network or serial connection. The universal controller may be configured to recognize new software and may initiate an update process during the next system startup, or at another predetermined time. Once initiated, the update process may run unattended. The successful completion or failure of the update process may be recorded in a log file along with any failure codes, and may be stored on the universal controller.

According to one aspect of the invention, the universal controller may be housed in a controller cabinet, designed to meet the requirements for National Electrical Manufacturers Association "NEMA 3R" rated enclosures. Other controller cabinet design requirements may be used. The controller cabinet may be equipped with a hinged door (or doors) containing a locking mechanism to prevent unauthorized access. The exterior and interior finish of the entire cabinet may be sufficiently durable to withstand exposure to chemicals and environmental conditions normally encountered in the automotive maintenance and diagnostic environment. The controller cabinet may be wall mounted or placed on a stationary or movable pedestal. Other controller cabinet embodiments or configurations may exist.

According to one aspect of the invention, the universal controller, including the software and hardware enclosed in the controller cabinet, may operate in ambient air temperatures ranging from 35 to 110 degrees Fahrenheit. The controller cabinet may be designed so that adequate air flow is provided around components of the universal controller to prevent overheating, and to prevent the condensation of water vapor. The universal controller, including the software and hardware enclosed in the controller cabinet, may operate at up to 95% relative humidity throughout the required temperature range. Embodiments and configurations enabling operation in other conditions may exist.

According to one aspect of the invention, the universal controller may provide electrical power required by one or more components. The universal controller may also include electrical power receptacle outlets of various configurations that provide electrical power required by one or more components. Fuses or circuit breakers may be used to protect individual electrical circuits of the universal controller and the circuits of components. Main fuses and/or circuit breakers may be readily accessible from the exterior of the controller cabinet. The fuses and/or circuit breakers may be configured such that controller operation may be unaffected by electrical line noise and voltage surges. The universal controller may be sufficiently protected from voltage surges to prevent damage to itself from the simultaneous startup of one or more pieces of equipment commonly found in the automotive maintenance and diagnostic environment (e.g., a 220-volt compressor, an arc welder, hydraulic lift controls, or other equipment.).

According to one aspect of the invention, the configuration of the universal controller may be such that electromagnetic signals found in the automotive maintenance and diagnostic environment shall not cause malfunctions or changes in the accuracy of the universal controller. The universal controller design may ensure that readings do not vary as a result of electromagnetic radiation or from induction devices normally found in the automotive maintenance and diagnostic environment (including high energy vehicle ignition systems). The universal controller may contain additional protection systems to ensure that the CPU and memory components are sufficiently protected to prevent the loss of programs, calibration data, setup parameters, or other data.

According to one aspect of the invention, the universal controller may include, and/or be operatively connected to, a motor controller subassembly ("motor controller"). The motor-controller may include, for example, an inverter style motor controller, or equivalent. The motor controller may enable low-loss speed control of a three-phase motor by independent control of the output frequency and output voltage while the speed/torque response of the motor remains unchanged due to automatic control of the voltage/frequency ratio. The motor controller may control various motors used for component operation such as, for example, dynamometer operation, brake tester operation, and/or other motor-driven component operation.

According to one aspect of the invention, the universal controller may include a control setting module. The control setting module may be capable of setting a component dynamometer horsepower load as commanded by a user. This may be accomplished by varying the signal from a power absorbing unit (PAU) control board included in the universal controller to the power-absorbing unit on a dynamometer. The PAU control board may control the DC output voltage to a component dynamometer PAU. The PAU control board may reside inside a controller cabinet. Such PAU load control may ramp up gradually and may not start until rolls on the dynamometer reach a minimum speed of 10 MPH, or other predetermined speed. The control setting module may also control a dynamometer's speed by increasing or decreasing the load from the PAU. Furthermore, the control setting module may enable measurement of dynamometer roll speeds by sensing pulses from a dynamometer's primary and secondary roll speed sensors.

According to one aspect of the invention, the universal controller may include a drive trace module. The drive trace module may utilize speed and time data from a drive trace file on a hard drive (or other storage device) associated with the universal controller to generate a vehicle-test drive-trace for a vehicle being tested on a dynamometer. A drive-trace may refer to a visual representation of vehicle speed over time during an emissions test on a dynamometer. Multiple drive traces may be stored on the hard drive and may be selected for use by a user depending on the vehicle test mode requirements. A drive trace module may also simulate a perfect drive trace so that it is not necessary to drive a vehicle on the dynamometer. This mode may be used for software development, operator training, trouble-shooting, or for other purposes. The drive trace module may further log the total time accumulated during a vehicle test drive trace, and may also calculate and log the actual distance driven by a vehicle during a drive trace test.

According to one aspect of the invention, the universal controller may include a calibration module. The calibration module may enable a calibration procedure for components regardless of the type or manufacturer of the components. This calibration procedure may include ASM and Transient TESTS according to United States Environmental Protection Agency (EPA) and California Bureau of Automotive Repair (BAR) specifications. This calibration procedure may run automatically upon the occurrence of a predetermined event such as, for example, recognition of an operative connection with a component.

The calibration module may further enable the reception of calibration values, including the necessary value type and the values themselves, for specific components regardless of the type or manufacturer of the components. The calibration module may then apply the calibration values to the operation of components. For example, a dynamometer may require calibration values for dynamometer roll diameter, two wheel drive inertia weight, four wheel drive inertia weight, calibration arm length, power absorbing unit (PAU) calibration weight, scale calibration weight, scale calibration arm ratio, primary speed pulses per revolution, secondary speed pulses per revolution, or other values. For other types and/or brands of components, different value types and values themselves may be necessary.

The calibration module of the universal controller may enable the determination of the generic tire/roll loss (GTRL) of a dynamometer. GTRL may include, for instance, tire to dynamometer roll friction loss and vehicle drive train losses. GTRL may be determined by the calibration module on a vehicle and dynamometer roll size specific basis, or may be determined by using default values presented in EPA or BAR97 documentation (for example, *Acceleration Simulation Mode test Procedures, Emissions Standards, Quality Control Requirements, and Equipment Specifications*, United States Environmental Protection Agency, EPA-AA-RSPD-IM-96-2, July 2000; BAR-97 *Emissions Inspection System Specification*, California Bureau of Automotive Repair, May 1996 [and all subsequent addenda]). The calibration module may further utilize the GTRL calculation or values to determine the horsepower load for specific vehicles.

According to one aspect of the invention, the calibration module of the universal controller may enable performance of a dynamometer manufacturer's standard procedure for proper warm-up such as, for instance, warm-up over a 35 to 110 degree Fahrenheit temperature range or other ranges. The calibration module may also run a coast-down calibration check at the end of the warm-up period to verify that the warm-up was successful. Furthermore, dynamometers with electric and mechanical inertia simulation may receive daily unloaded (no vehicle) coast-down checks over the respective range of the vehicle test speed. The calibration module may run this daily coast-down check at alternating combinations of inertia and parasitic load settings.

According to one aspect of the invention, the calibration module of the universal controller may enable automatic measurement, storage, and accurate application of internal friction curves (parasitic loss) for a dynamometer. Internal friction curves may include, for example, bearing and windage friction expressed as a function of velocity. If the dynamometer is unable to pass a coast-down check, the dynamometer's parasitic loss may be determined at the respective vehicle test speed.

If a dynamometer fails a coast-down check or requires re-calibration for any other reason, a load measuring device may be checked by the universal controller's calibration module. This check may utilize a dead-weight method (or BAR-approved equivalent), and may cover at least three points over the range of loads used for vehicle testing. Dead-weights may be traceable to National Institutes of Standards and Technology (NIST) standards, and shall be accurate to within acceptable tolerances.

The calibration module may also enable performance of zero and span PAU load cell calibrations. For these PAU load cell calibrations, a calibration arm may be attached to the PAU, and up to three weights (or other number of weights) may be used to check and adjust the load cell curve.

The calibration module may calibrate a PAU control board. The PAU control board may control the DC output voltage to a dynamometer PAU (power absorbing unit). The PAU control board may reside inside a controller cabinet. A user may perform PAU control board calibrations by measuring zero, half span, and full span voltages. These values may then be entered into the universal controller by a user. Corrections may be made by adjustment of potentiometers on the PAU control board.

According to one aspect of the invention, the calibration module may be capable of calculating and storing a dynamometer's base inertia weight. The specified base inertia may agree with acceptance testing measurements within ±10 pounds or other predetermined value. Furthermore, the calibration module may enable performance of weight scale calibration using a single weight and calibration arm.

According to one aspect of the invention, the universal controller may include a wheelbase adjustment module. The wheelbase adjustment module may determine the wheelbase setting and adjust the spacing of the rear roll set of an all-wheel drive (AWD) capable dynamometer (thus altering the wheelbase setting) to accommodate various wheelbases for AWD vehicles. The wheelbase adjustment module may also control a locking mechanism for the dynamometer's wheelbase adjustment system.

According to one aspect of the invention, the universal controller may include a vehicle position module. The vehicle position module may enable calculation of a vehicle's position in a garage bay or other maintenance environment. This calculation may be utilized by certain components. By way of example, photo-cell sensors may be utilized by components to sense the vehicle's position. Such sensors may be mounted on or near the components. The vehicle position module may utilize data from these sensors to perform calculations necessary to convey vehicle position.

According to one aspect of the invention, the universal controller may include a vehicle restraint module. The vehicle restraint module may control a vehicle restraint system of a particular component. Certain types of components may include vehicle restraint systems which safely restrain the motion of vehicles during testing/operation, while allowing unobstructed ingress, egress, and/or physical activity on and around the vehicle or components. Vehicle restraint systems may be operated by electric or air powered motors (restraint motors), while manual restraints may be mechanically attached and removed by an operator.

The vehicle restraint module may enable automatic control of vehicle restraint motors (provided components require the use of, and contain the proper means for, a vehicle restraint system) regardless of the type or manufacturer of the components. This control may include the determination of the status of the component's restraints (engaged vs. disengaged). The vehicle restraint module may not allow a vehicle test or procedure to initiate unless the component's vehicle restraint system is properly engaged. Furthermore, the universal controller may include a vehicle restraint manual bypass switch to facilitate removal of a vehicle from a vehicle restraint system in case of system failure. This manual bypass switch may be mounted on the exterior of a controller cabinet (or at another convenient location) for ease of access.

According to one aspect of the invention, the universal controller may include a vehicle lift control module. The vehicle lift control module may enable the automatic control of a component's vehicle lift system. A dynamometer, for example, may include a lift system for lifting vehicle tires into and out of dynamometer rolls. The vehicle lift control module may determine the status of the vehicle lift system (up, down, or gradations in between) and may be able to control lift status. Additionally, the universal controller may include a vehicle lift manual bypass switch to facilitate removal of a vehicle in case of system failure. The vehicle lift manual bypass switch may be mounted on the exterior of a controller cabinet (or at another convenient location) for ease of access.

According to one aspect of the invention, the universal controller may include an emergency stop module. The emergency stop module may enable emergency shutdown of an active component procedure in an emergency situation. For example, the emergency stop module may enable the shutdown of a dynamometer by applying sufficient PAU loading and/or application of a roll brake to rapidly reduce a vehicle's speed to zero. An emergency stop may be invoked by a computer command from the universal controller (initiated by a user or upon the occurrence of predetermined emergency parameters) or by the activation of an emergency stop button switch. The emergency stop button switch may be located on the outside of the controller cabinet or in a remote location (providing faster user access).

According to one aspect of the invention, the universal controller may include a diagnostic module. The diagnostic module may identify internal faults and errors of the universal controller and of components operatively connected thereto. The diagnostic module may log these faults and errors and display them to a user. Furthermore, the diagnostic module may run a self check of the universal controller's internal components, and on controlled components. A log containing a report of faults or errors may be created and stored.

According to one aspect of the invention, the universal controller may include a warning beacon. The warning beacon may, for example, include a light mounted on the universal controller or controller cabinet that, when activated by the diagnostic module, may flash and warn users when faults or errors are detected. Alternatively, the warning beacon may comprise a graphical signal depicted on a graphical user interface of the universal controller.

According to one aspect of the invention, the universal controller may include an augmented braking module. The augmented braking module may enable the universal controller to apply augmented breaking of a vehicle undergoing testing on a dynamometer on major decelerations over 2 MPH per second or other value as specified by a chosen drive cycle. Augmented breaking may be actuated when negative force applied by a vehicle at a dynamometer roll surface is greater than 110 pounds or other predetermined force. If augmented breaking is not linked to driver breaking, the vehicle driver may be signaled to refrain from accelerating the vehicle during this period.

According to one aspect of the invention, the universal controller may include a speed synchronization module. The speed synchronization module may monitor a speed signal from front and rear speed sensors of a dynamometer. If synchronization between the front and rear speed sensors is greater than ±0.1 MPH or some other predetermined value, the speed synchronization module may alert a user by causing an error message to be displayed.

According to one aspect of the invention, the universal controller may include a radio frequency (RF) remote control device. This remote control device may enable an operator to start, stop, perform emergency stop, or perform other necessary or convenient functions associated with components. The remote control device may enable these functions to be performed from a location remote from, but nearby to, the universal controller, for example, inside a vehicle being tested/repaired.

According to one aspect of the invention, the universal controller may include a data analysis module. The data analysis module may gather test data returned by a specific component, store the data on a hard disk or other data storage device, process the data, and report test results regardless of the type or manufacturer of the component. Processed test results may then be stored on a hard disk or other data storage device associated with the universal controller. In some embodiments, the universal controller may include, interface to, or otherwise be associated with, a printer or similar device for printing test results or other data.

Advantages of the invention include its ability to provide a common core on which any number of modular components, each of which may perform different functions, may be added. Additionally, the invention enables compatibility with these modular components, regardless of their manufacturer or date of manufacture. This versatility may enable a vendor to provide compatible and customizable automotive maintenance/diagnostic systems to a myriad of automotive service providers. Such systems may be provided as a whole or as an addition to an existing system or existing set of components. Furthermore, as the state-of-the-art in automotive maintenance and diagnostic components advances, newly developed components may be added to existing systems built around this invention.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION

The invention provides a computer-implemented universal automotive maintenance component controller apparatus (hereinafter "universal controller") as the common core of a modular vehicle maintenance and/or diagnostic system. The universal controller may control multiple types of light-duty vehicle (including light truck) and heavy-duty vehicle maintenance/diagnostic components in either a centralized or de-centralized vehicle testing environment. The universal controller may serve as an interface between its own test system computer and multiple vendors' diagnostic, performance, safety, or repair components in a test lane, garage bay, open-air test area, or other automotive maintenance environment.

Diagnostic, performance, safety, or repair components may include, for instance, a dynamometer for loaded vehicle testing (such as, for example, dynamometers marketed by AREX, MAHA [Maschinenbau Haidenwang GmbH & Co. KG], Hunter Engineering Co., Launch Tech Co., Mustang Dynamometer, Iyasaka LTD., Cartec, or other makes of dynamometers), vehicle weighing equipment, a sideslip tester (such as, for example, sideslip testers marketed by AREX, MAHA, Hunter Engineering Co., Launch Tech Co., Mustang Dynamometer, Iyasaka LTD., Cartec, or other makes of sideslip testers), suspension testing equipment, a roller brake tester (such as, for example, Launch Tech Co., Mustang Dynamometer, Iyasaka LTD., Cartec, or other make of roller brake tester), a platform brake tester (such as, for example, AREX, MAHA, Hunter Engineering Co., or other make of platform brake tester), other brake testing equipment, speedometer testing equipment (such as, for example, MAHA, Launch Tech Co., Mustang Dynamometer, Iyasaka LTD., Hunter Engineering Co., or other make of speedometer testing equipment), a headlight tester (such as, for example, MAHA, Launch Tech Co., Mustang Dynamometer, Iyasaka LTD., Hunter Engineering Co., or other make of headlight tester), engine testing equipment, fuel economy testing equipment, fuel tank testing equipment, gas cap testing equipment, on-board-diagnostic (OBD) system test equipment, alignment testing equipment, noise testing equipment (such as, for example Brüel & Kjaer, Extech Instruments, RadioShack, Cirrus Research PLC, or other make of noise testing equipment), visual vehicle inspection equipment, or any other computer-implemented automotive maintenance component. The universal controller may integrate with a user's existing components or may be used in programs requiring new installations. The universal controller may be capable of receiving BAR97 (California Department of Consumer Affairs Bureau of Automotive Repair 1997 Emissions Inspection System Specification) technical certification and ETL/UL (Electrical Testing Laboratories, Inc./Underwriters Limited) electrical certification or other certification.

Figure 1A:
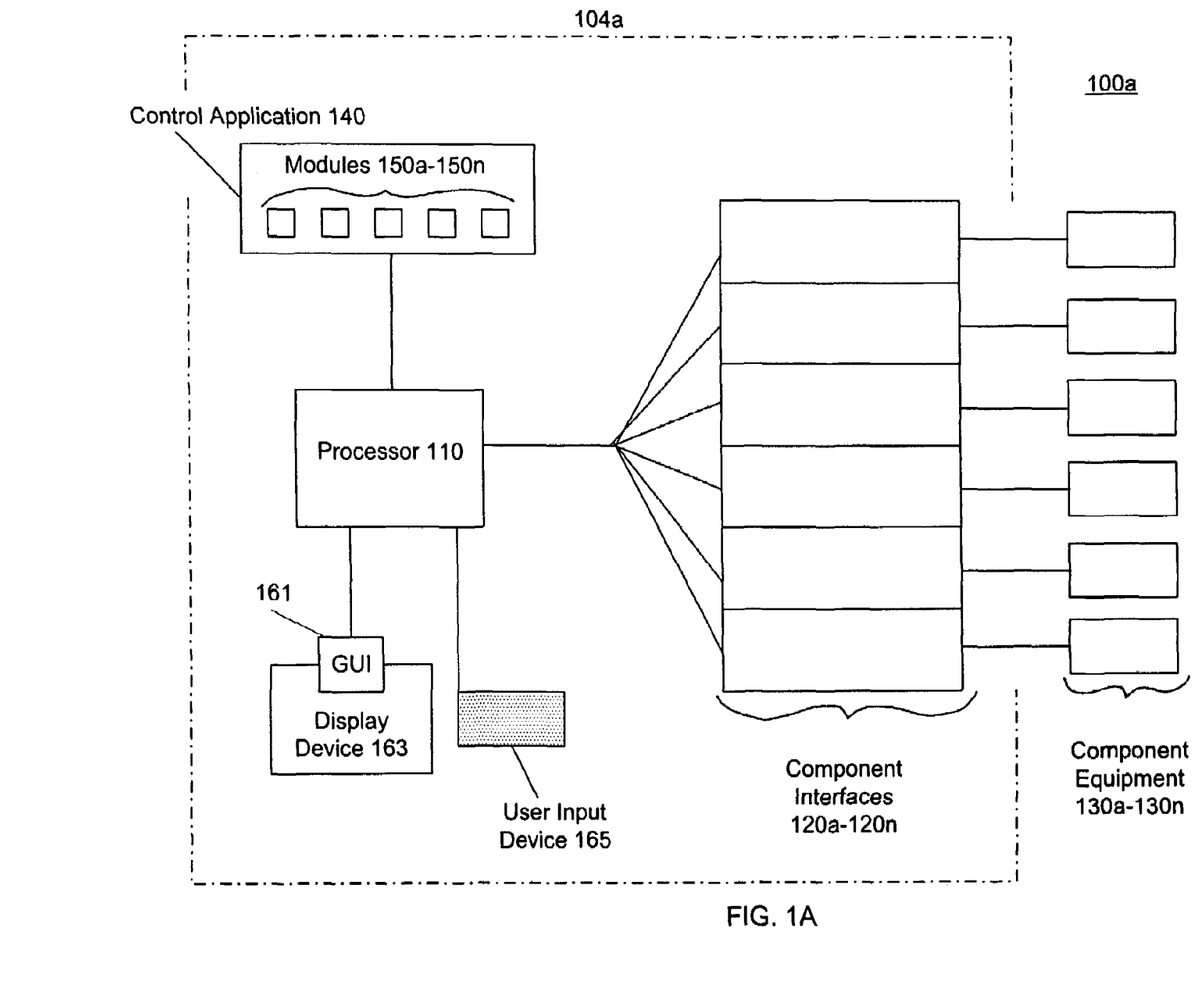
FIG. 1A illustrates a schematic diagram of a universal controller, according to an embodiment of the invention.

According to an embodiment of the invention illustrated in FIG. 1A, a system 100a is provided for a universal controller 104a. Universal controller 104a may include a processor 110, which may be or include, for instance, any of the Intel x86 PC/AT microprocessors or compatible processors such as those available from Cyrix or AMD. In some embodiments, the processor 110 may be housed on a CPU board. Other processors may be utilized.

According to one aspect of the invention, processor 110 may be operatively connected to one or more component interfaces 120a-120n. The operative connection between processor 110 and one or more component interfaces 120a-120n may include, for instance, an attachment with a CPU board according to a stackable PC 104 configuration. Other connections and configurations may be used. A component interface 120 may comprise an application board (e.g., daughter board) that is specific to a particular component to be used and an accompanying port. A port may include, for instance, a serial device interface such as a universal serial bus (USB) port. Operative connections between the one or more component interfaces and components may include, for example, quick disconnect locking connectors. Other types of ports and/or connectors may be used.

The one or more component interfaces 120a-120n may enable operative connections with one or more pieces of automotive maintenance/diagnostic components (hereinafter "automotive maintenance components" or "components") 130a-130n. One or more components 130a-130n may include any computer-implemented equipment, now existing or hereafter developed, for the performance of automobile diagnostics, performance, safety, and/or repair tasks. Such tasks may include emissions testing, vehicle weighing, sideslip testing, suspension testing, brake testing, speedometer testing, headlight testing, engine testing, fuel economy testing, fuel tank testing, gas cap testing, on-board-diagnostic (OBD) testing, alignment testing, noise testing, visual vehicle testing, or any automotive maintenance task that is, or can be tested using computer-implemented equipment. One or more components 130a-130n may be compatible with universal controller 104a regardless of its type or manufacturer.

System 100a may include a control application 140, which may comprise one or more software modules 150a-150n that enable a user to interface with and control universal controller 104a and components operatively connected to universal controller 104a. Control application 140 may also include one or more software modules for the receipt and analysis of data returned by one or more components 130a-130n. Control application 140 may be based on any one of many computer programming languages such as, for example, Microsoft's MS CE.Net language.

Figure 2:
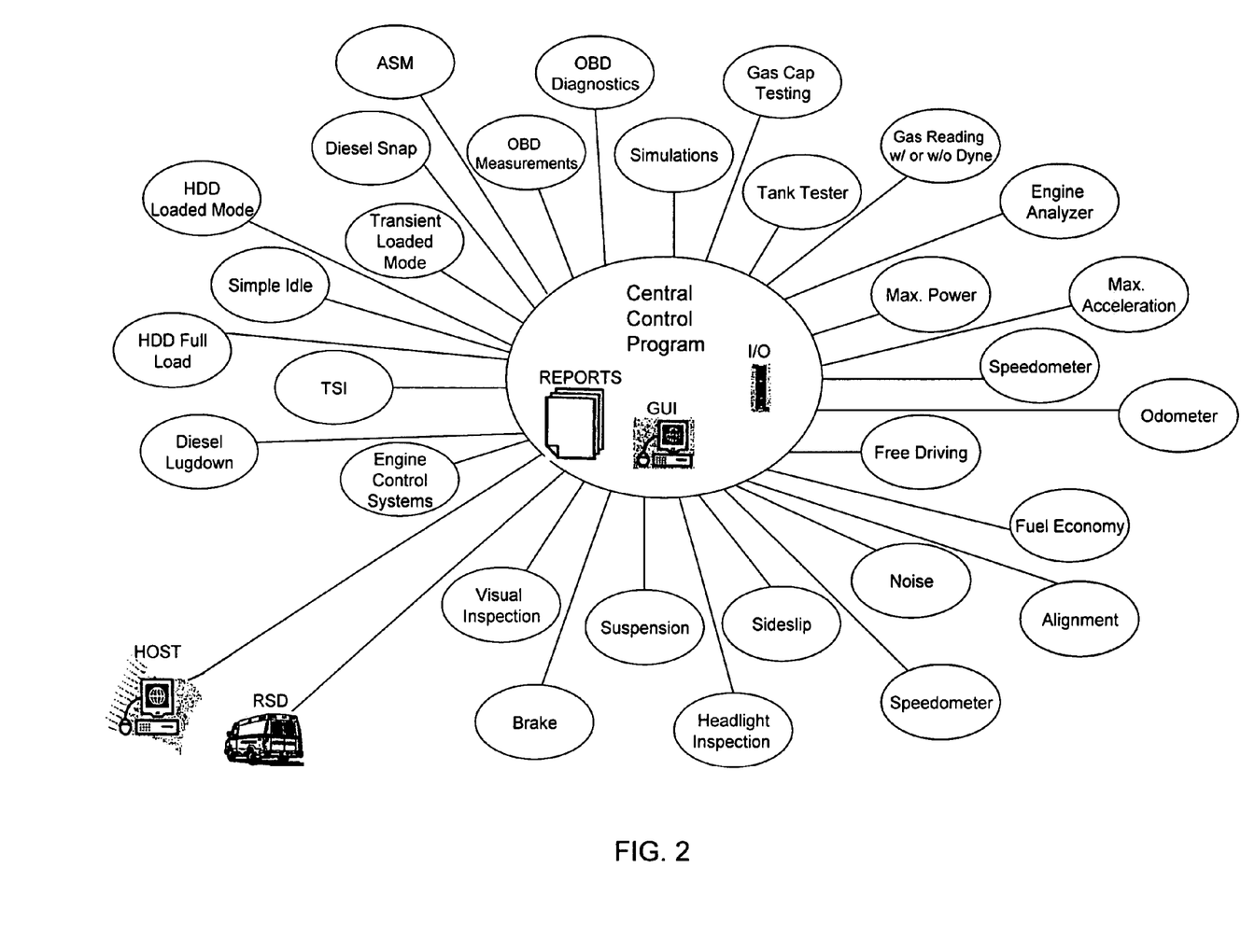
FIG. 2 illustrates an exemplary embodiment of the invention including numerous components and/or modules, according to an embodiment of the invention.

In particular, control application 140 may include a control setting module, a drive trace module, a calibration module, a wheelbase adjustment module, a vehicle position module, a vehicle restraint module, an emergency stop module, a vehicle lift control module, a diagnostic module, an augmented braking module, a speed synchronization module, a data analysis module, a report module, or other modules. As illustrated in FIG. 2, any number of components and/or modules may be present. One or more of the modules comprising application 140 may be combined. For some purposes, not all modules may be necessary.

In one embodiment, universal controller 104a may be customized based on a user's needs. Control application 140 may be flexible such that the compliment of controlled components may be changed without alteration of controller 104a (other than the need to add an application board specific to any new equipment) or effect to the overall functionality of controller 104a. Furthermore, control application 140 may include a comprehensive compliment of modules to enable use of components in any given national or product market.

According to one aspect of the invention, one or more users may access universal controller 104a and control application 140 through an interface. The interface may comprise a graphical user interface 161 presented to a user on a display device 163. A user may interact with control application 140 and graphical user interface 161 via a user input device 165. In one embodiment, a display device 163 may be or include, for instance, a display screen such as a LCD screen. User input device 165 may be or include, for instance, a digital keypad with various keys, including arrow keys, alphanumeric keys, an enter key, or other keys. The display screen may enable the display of menus, which a user may scroll through and select from using the digital keypad. The digital keypad and display screen may also enable the input of instructions, words, numbers, or other data. Both the digital keypad and the display screen may be operatively connected to processor 110.

According to another embodiment of the invention, graphical user interface 161 may comprise interfaces enabled by known computer operating systems, for instance, Microsoft Windows, Linux, DOS, or other real time operating systems. Graphical user interface 161 may be displayed via display device 163 which may comprise, for instance, a VGA computer monitor, multi-colored LCD screen, or other display device capable of presenting complex visual data to a user. User input device 165 may comprise a standard "QWERTY" computer keyboard, a mouse, a touch screen, or other data input device. A user may interact with and input data to universal controller 104a and control application 140 using user input device 165. In this and other alternative embodiments, display device 163 and user input device 165 may be operatively connected with processor 110.

Figure 1B:
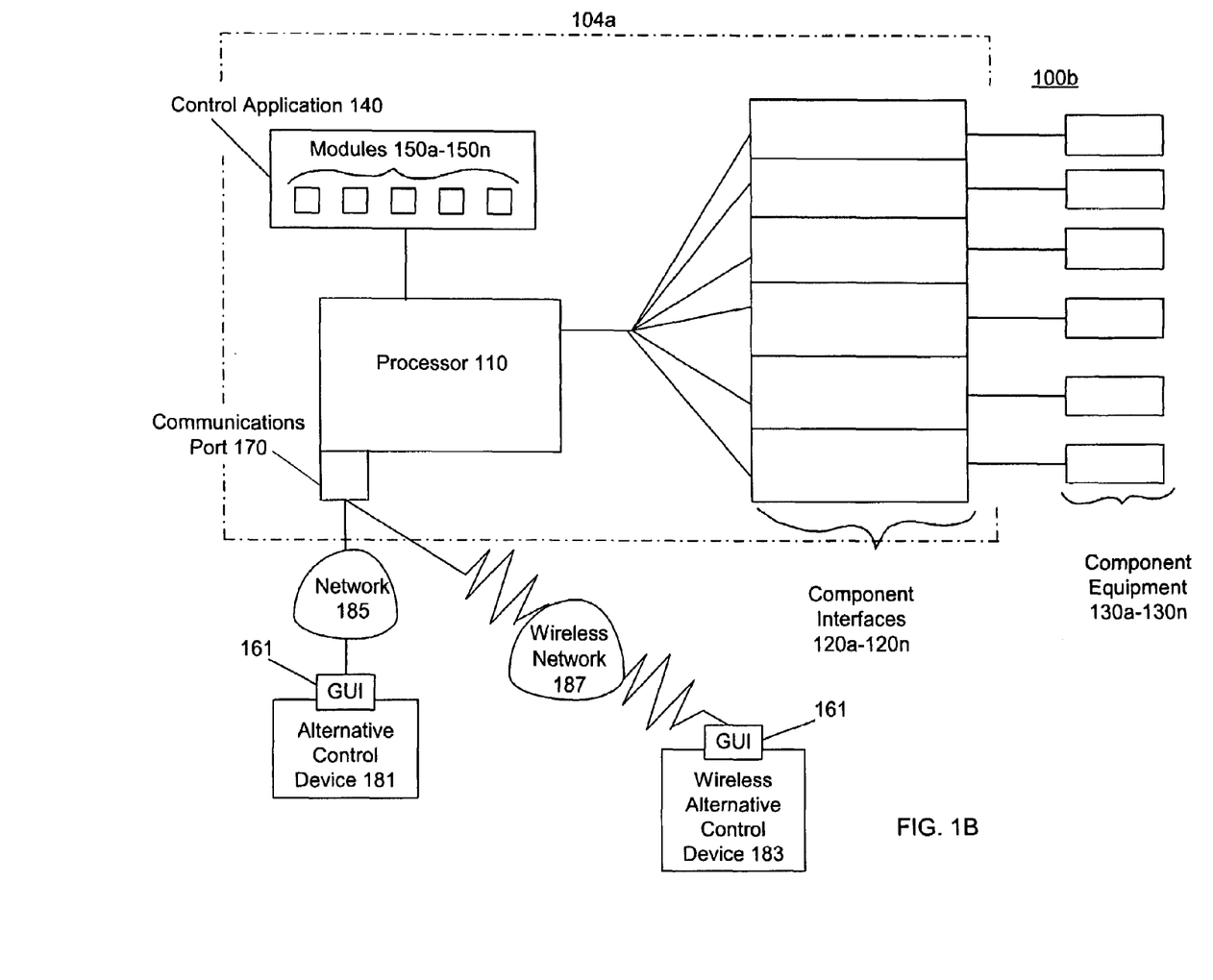
FIG. 1B illustrates a schematic diagram of a universal controller, according to an embodiment of the invention.

According to one aspect of the invention illustrated in FIG. 1B, universal controller 104a may include one or more communications ports 170 (e.g., serial, Ethernet, wireless, etc.) enabling operative connection of an alternative control device 181 or a wireless alternative control device 183 ("wireless device 183") to processor 110. Alternative control device 181 may be or include, for instance, a server, PC, laptop, PDA, or other device capable of exchanging data with processor 110 via network 185 and communications port 170. Network 185 may include any one or more of, for instance, the Internet, an intranet, a PAN (Personal Area Network), a LAN (Local Area Network), a WAN (Wide Area Network), a SAN (Storage Area Network), or a MAN (Metropolitan Area Network). Any suitable communications link may be utilized including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, or other connection.

Figure 3:
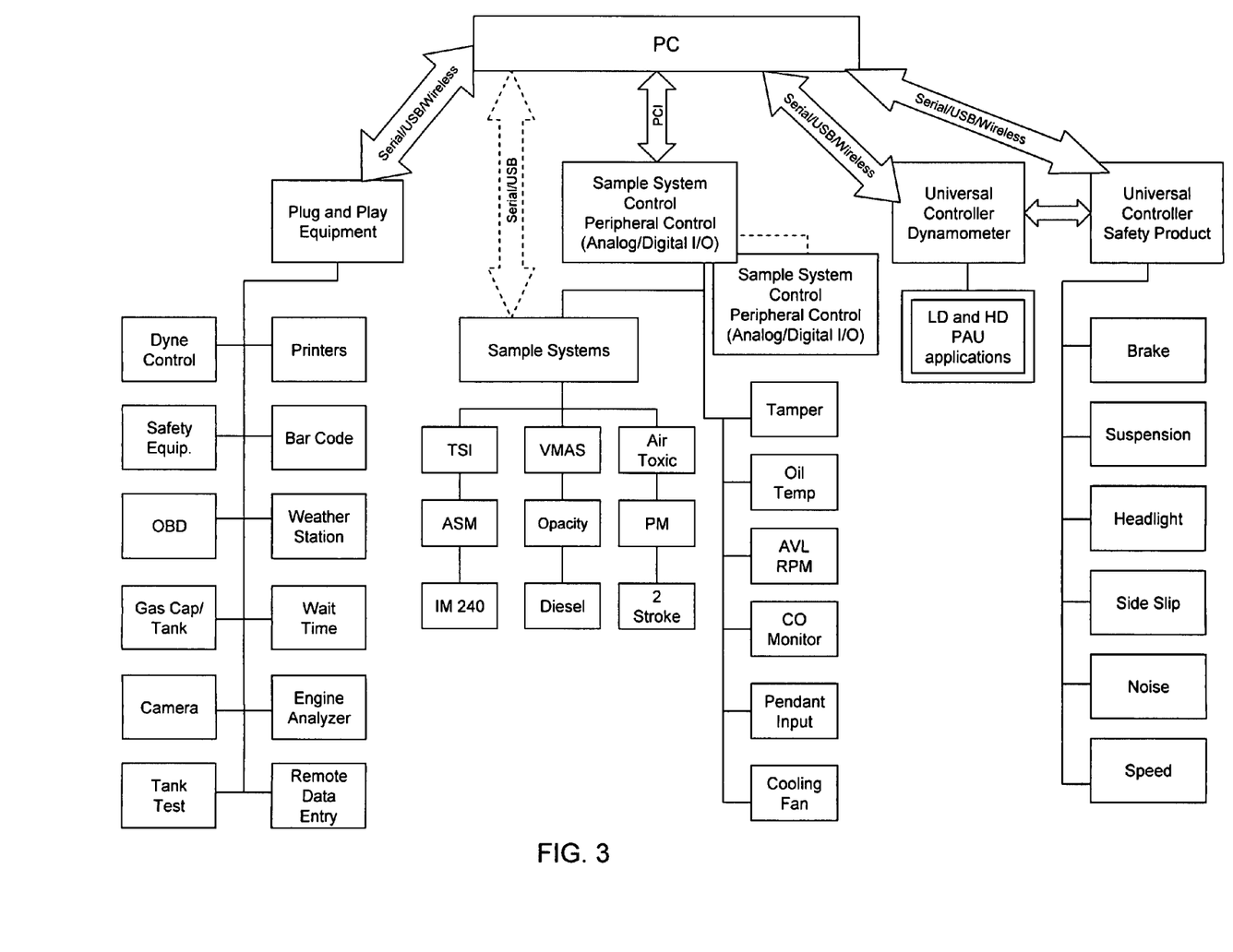
FIG. 3 illustrates a schematic diagram of a universal controller, according to an embodiment of the invention.

Wireless device 183 may include, for instance, a server, PC, laptop, PDA, cell phone, or other wireless enabled device capable of exchanging data with processor 110 via a wireless network 187 and communications port 170. Both alternative control device 181 and wireless device 183 may enable a user to remotely control components or exchange data/instructions with universal controller 104a. Furthermore, both alternative control device 181 and wireless device 183 may support a graphical user interface 161 and may perform the functions of display device 163 and user input device 165. Those having skill in the art will appreciate that the invention described herein may work with various system configurations. Accordingly, more or less of the aforementioned system components may be used and/or combined in various embodiments. As an example, FIG. 3 illustrates an exemplary configuration of a universal controller and various components, modules, and/or other elements that may interface with the universal controller according to various aspects of the invention.

It should be understood that various software modules 150a-150n utilized to accomplish the functionalities described herein may be maintained on one or more of processor 110, component interfaces 120a-120n, components 130a-130n, control application 140, alternative devices 181, wireless devices 183, or other components of the system. In other embodiments, as would be appreciated, the functionalities described herein may be implemented in various combinations of hardware and/or firmware, in addition to, or instead of, software.

Figure 1C:
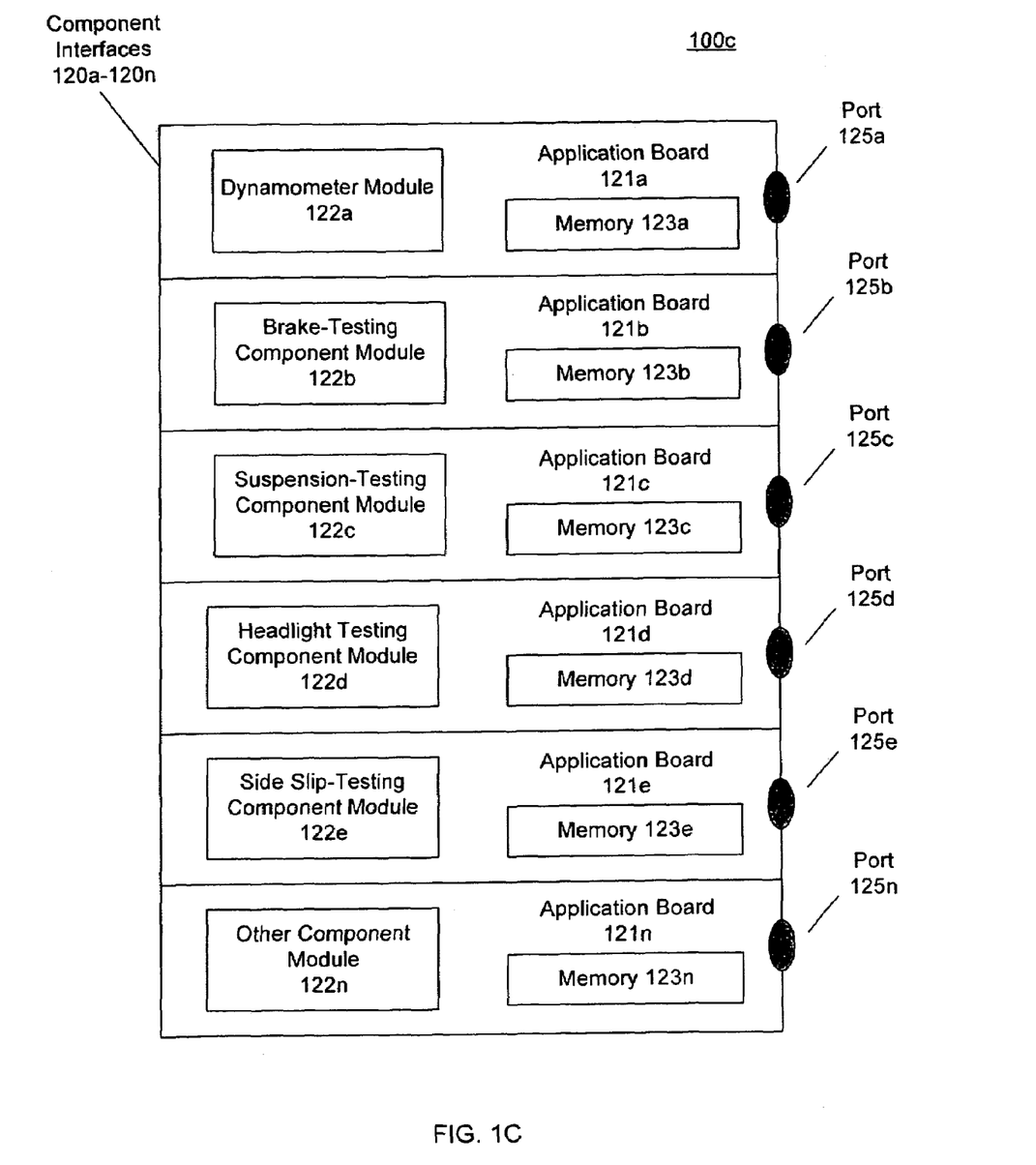
FIG. 1C illustrates a schematic diagram of one or more application boards, according to an embodiment of the invention.

According to an aspect of the invention illustrated in FIG. 1C, one or more component interfaces 120a-120n may each include an application board 121a-121n (e.g., daughter board). Some or all application board peripherals may be mapped in I/O. Component modules 122a-122n utilized for the operation of specific components may reside on application boards 121a-121n such as, for instance, dynamometer module 122a, brake-testing component module 122b, suspension-testing component module 122c, headlight-testing component module 122d, sideslip-testing component module 122e, or other component module 122n. Component modules 122a-122n may comprise software modules, firmware module, and/or other form of computer readable instructions comprising component specific application code and component specific operating systems.

Although FIG. 1C illustrates one of modules 122a-122n residing on each of application boards 121a-121n, multiple modules may reside on individual application boards 121n in other implementations. Application boards 121a-121n may identify the specific manufacture and type of component to the processor of universal controller 104a. Compact FLASH IDE drives 123a-123n or other memory may also reside on application boards 121a-121n. Operative electrical connections 125a-125n between the one or more component interfaces 120a-120n and components may comprise a serial device interface such as a universal serial bus (USB) port. Other types of ports for establishing operative connections between processors and components may be utilized. Operative connections between the one or more component interfaces and components may include, for example, quick disconnect locking connectors. Other connectors may be used.

Figure 4:
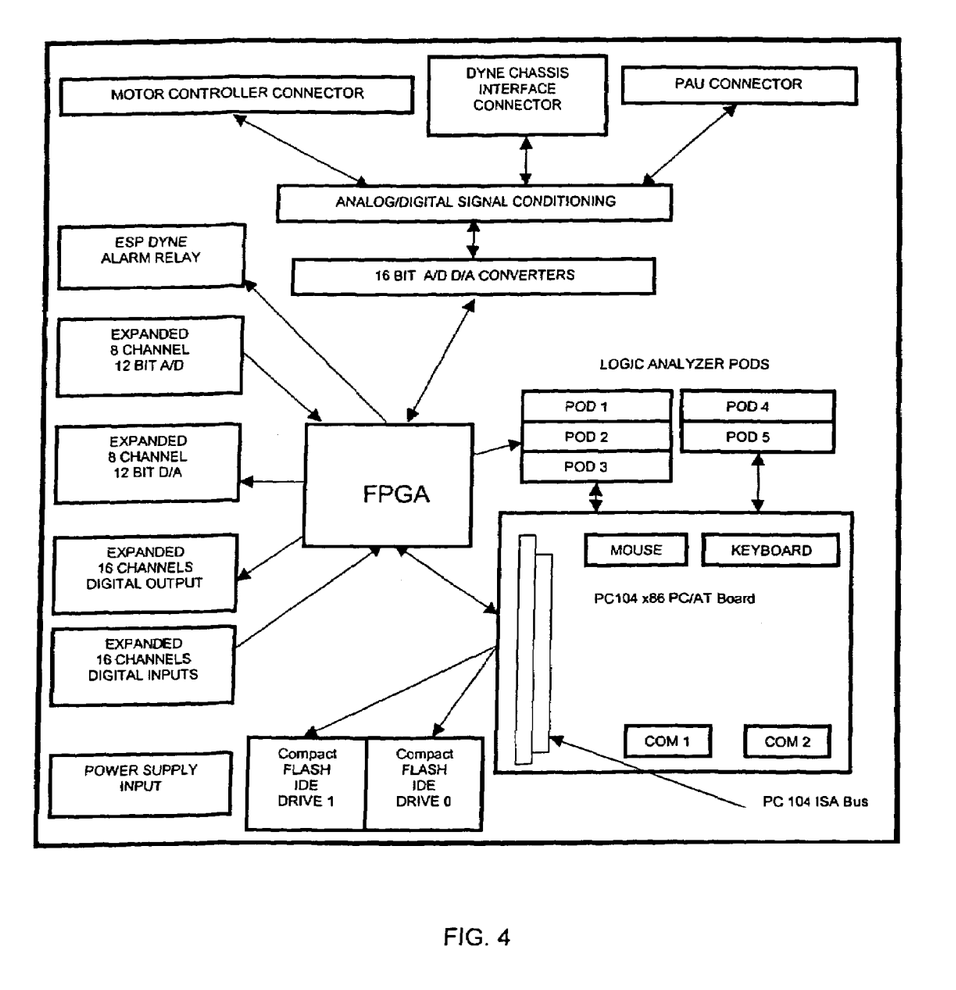
FIG. 4 illustrates a schematic diagram of an exemplary embodiment of a CPU, according to an embodiment of the invention.

According to an embodiment of the invention, a processor of universal controller 104a may be part of a central processing unit (CPU) which may include some or all of the elements described in systems 100a and 100b. This central processing unit may also include: on board multi-baud RS232 and RS422 communications/diagnostics ports; 4 gigabytes or more of fast access solid-state hard drive storage; integrated analog and digital signal conditioning; expanded 16 channels of digital inputs and outputs; expanded 8 channels of 12 bit A/D and D/A; logic analyzer POD interface for debugging, or other components. Other configurations exist, for example, as illustrated in FIG. 4.

According to one aspect of the invention, universal controller 104a may perform automated software module updates. For example, upon release of a new software module, the new software module may be transmitted to universal controller 104a via communications port 107 and a network 185 (or network 187) or a serial connection. Universal controller 104a may be configured to recognize new software and may initiate an update process during the next system startup or at another predetermined time. Once initiated, the update process may run unattended. The successful completion or failure of the update process may be recorded in a log file along with any failure codes and may be stored on the universal controller.

According to one aspect of the invention, universal controller 104a may be housed in a controller cabinet designed to meet the requirements for NEMA 3R rated enclosures. The controller cabinet may be equipped with a hinged door (or doors) containing a locking mechanism to prevent unauthorized access. The exterior and interior finish of the entire cabinet may be sufficiently durable to withstand exposure to chemicals and environmental conditions normally encountered in the automotive maintenance and diagnostic environment. The controller cabinet may be wall mounted or placed on a stationary or movable pedestal.

According to one aspect of the invention, universal controller 104a, including some or all software and hardware enclosed in a controller cabinet, may operate in ambient air temperatures ranging from 35 to 110 degrees Fahrenheit. The controller cabinet may be designed so that adequate air flow is provided around the elements of universal controller 104a to prevent overheating and to prevent the condensation of water vapor. Universal controller 104a, including some or all software and hardware enclosed in the controller cabinet, may operate at up to 95% relative humidity throughout the required temperature range. Embodiments and configurations enabling operation in other conditions may exist.

According to one aspect of the invention, universal controller 104a may provide electrical power required by one or more components. Accordingly, universal controller 104a may include one or more electrical receptacle outlets of various configurations for providing the electrical power required by one or more components. Universal controller 104a may operate on AC power on a 208-230 VAC at 50-60 Hz. Fuses or circuit breakers may be used to protect individual electrical circuits of universal controller 104a and the circuits of components. Main fuses and/or circuit breakers may be readily accessible from the exterior of the controller cabinet. The fuses and/or circuit breakers may be configured such that controller operation may be unaffected by electrical line noise and voltage surges. Universal controller 104a may be sufficiently protected from voltage surges. For example, universal controller 104a may be sufficiently protected from voltage surges caused by the simultaneous startup of one or more pieces of equipment commonly found in an automotive maintenance and diagnostic environment such as, for instance, a 220-volt compressor, an arc welder, hydraulic lift controls, or other equipment.

According to one aspect of the invention, the configuration of universal controller 104a may be such that electromagnetic signals found in an automotive maintenance and diagnostic environment shall not cause malfunctions or changes in the accuracy of the universal controller. The design of universal controller 104a may ensure that readings do not vary as a result of electromagnetic radiation or from induction devices normally found in the automotive maintenance and diagnostic environment (including high energy vehicle ignition systems). Universal controller 104a may contain additional protection systems to ensure that the CPU and memory components are sufficiently protected to prevent the loss of programs, calibration data, setup parameters, or other data.

According to one aspect of the invention, universal controller 104a may include, and/or be operatively connected to, a motor controller subassembly ("motor controller"). The motor-controller may include, for example, an inverter style motor controller, or equivalent. The motor controller may enable low-loss speed control of a three-phase motor by independent control of the output frequency and output voltage while the speed/torque response of the motor remains unchanged due to automatic control of the voltage/frequency ratio.

According to one aspect of the invention, universal controller 104a may interact with, control, and support a dynamometer as an interfacing component. Examples of dynamometers may include commercially available Iyasaka™ or Mustang™ dynamometers as well as other dynamometers.

According to one aspect of the invention, universal controller 104a may include a control setting module. The control setting module may be capable of setting a component dynamometer horsepower load as commanded by a user. This may be accomplished by varying the signal from a power-absorbing unit (PAU) control board included in universal controller 104a to the power-absorbing unit on a dynamometer. The PAU control board may control the DC output voltage to a component dynamometer PAU. The PAU control board may reside inside a controller cabinet. Such PAU load control may ramp up gradually and may not start until rolls on the dynamometer reach a minimum speed of 10 MPH or other predetermined speed. The control setting module may also control a dynamometer's speed by increasing or decreasing the load from the PAU. Furthermore, the control setting module may enable measurement of dynamometer roll speeds by sensing pulses from a dynamometer's primary and secondary roll speed sensors.

According to one aspect of the invention, universal controller 104a may include a drive trace module. The drive trace module may use speed and time data from a drive trace file on a hard drive (or other storage device) within universal controller 104a to generate a vehicle test drive trace for a vehicle being tested on a dynamometer. Multiple drive traces may be stored on the hard drive and may be selected for use by a user depending on the vehicle test mode requirements. A drive trace module may also simulate a perfect drive trace such that it may not be necessary to test a vehicle on the dynamometer. This mode may be used for software development, operator training, trouble shooting or for other purposes. The drive trace module may log the total time accumulated during a vehicle test drive trace. The drive trace module may also calculate and log the actual distance driven by a vehicle during a drive trace test.

According to one aspect of the invention, universal controller 104a may include a calibration module. The calibration module may enable a calibration procedure for components regardless of the type or manufacturer of the component. This calibration procedure may include ASM and Transient TESTS according to United States Environmental Protection Agency (EPA) and California Bureau of Automotive Repair (BAR) specifications. This calibration procedure may run automatically upon the occurrence of a predetermined event such as, for example, recognition of an operative connection with a component.

The calibration module may further enable the reception of calibration values, including the necessary value type and the values themselves, for specific components regardless of the type or manufacturer of the components. The calibration module may then apply the calibration values to the operation of components. For example, a dynamometer may require calibration values for dynamometer roll diameter, two wheel drive inertia weight, four wheel drive inertia weight, calibration arm length, PAU calibration weight, scale calibration weight, scale calibration arm ratio, primary speed pulses per revolution, secondary speed pulses per revolution, or other values. For other types and/or brands of components, different value types and values themselves may be necessary.

The calibration module of universal controller 104a may enable the determination of the generic tire/roll loss (GTRL) of a dynamometer. GTRL may include, for instance, tire to dynamometer roll friction loss and vehicle drive train losses. GTRL may be determined by the calibration module on a vehicle and dynamometer roll size specific basis, or may be determined by using default values presented in EPA or BAR97 documentation (such as, for example, *Acceleration Simulation Mode test Procedures, Emissions Standards, Quality Control Requirements, and Equipment Specifications*, United States Environmental Protection Agency, EPA-AA-RSPD-IM-96-2, July 2000; BAR-97 *Emissions Inspection System Specification*, California Bureau of Automotive Repair, May 1996 [and all subsequent addenda]). The calibration module may further be capable of using the GTRL calculation or values to determine the horsepower load for specific vehicles.

According to one aspect of the invention, the calibration module of universal controller 104a may enable performance of a dynamometer manufacturer's standard procedure for proper warm-up such as, for instance, warm-up over a 35 to 110 degree Fahrenheit temperature range. The calibration module may also run a coast-down calibration check at the end of the warm-up period to verify that the warm up was successful. Furthermore, dynamometers with electric and mechanical inertia simulation may receive daily unloaded (no vehicle) coast-down checks over the respective range of the vehicle test speed. The calibration module may run this daily coast-down check at alternating combinations of inertia and parasitic load settings.

According to one aspect of the invention, the calibration module of universal controller 104a may enable automatic measurement, storage, and accurate application of internal friction curves (parasitic loss) of a dynamometer. Internal friction curves may include, for example, bearing and windage friction expressed as a function of velocity. If the dynamometer is unable to pass a coast-down check, the dynamometer's parasitic loss may be determined at the respective vehicle test speed.

If a dynamometer fails a coast-down check or requires re-calibration for any other reason, a load measuring device may be checked by universal controller 104a's calibration module. This check may utilize a dead-weight method (or BAR approved equivalent), and may cover at least three points over the range of loads used for vehicle testing. Dead-weights may be traceable to NIST, and shall be accurate to within acceptable tolerances.

The calibration module may also enable performance of zero and span PAU load cell calibrations. For these PAU load cell calibrations, a calibration arm may be attached to the PAU, and up to three weights (or other number of weights) may be used to check and adjust the load cell curve.

The calibration module may calibrate a PAU control board. The PAU control board may control the DC output voltage to a dynamometer PAU. The PAU control board may reside inside a controller cabinet. A user may perform PAU control board calibrations by measuring zero, half span, and full span voltages. These values may then be entered into universal controller 104a by a user. Corrections may be made by adjustment of potentiometers on the PAU control board.

According to one aspect of the invention, the calibration module may be capable of calculating and storing a dynamometer's base inertia weight. The specified base inertia may agree with acceptance testing measurements within ±10 pounds or other predetermined value. Furthermore, the calibration module may enable performance of weight scale calibration using a single weight and calibration arm.

According to one aspect of the invention, universal controller 104a may include a wheelbase adjustment module. The wheelbase adjustment module may determine the wheelbase setting and adjust the spacing of the rear roll set of an all-wheel drive (AWD) capable dynamometer (thus altering the wheelbase setting) to accommodate various wheelbases for AWD vehicles. The wheelbase adjustment module may also control a locking mechanism for the component dynamometer's wheelbase adjustment system.

According to one aspect of the invention, universal controller 104a may include a vehicle position module. The vehicle position module may enable calculation of a vehicle's position in a garage bay or other maintenance or diagnostic environment. This calculation may be utilized by certain components. By way of example, photo-cell sensors may be utilized by components to sense the vehicle's position. Such sensors may be mounted on or near the components. The vehicle position module may utilize data from these sensors to perform calculations necessary to convey vehicle position.

According to one aspect of the invention, universal controller 104a may include a vehicle restraint module. The vehicle restraint module may control a vehicle restraint system of a component. Certain types of components may include vehicle restraint systems which safely restrain the motion of vehicles during testing/operation, while allowing unobstructed ingress, egress, and/or physical activity on and around the vehicle or component. Vehicle restraint systems may be operated by electric or air-powered motors (restraint motors), while manual restraints may be mechanically attached and removed by an operator.

The vehicle restraint module may enable automatic control of vehicle restraint motors (provided a component requires the use of, and contains the proper means for, a vehicle restraint system) regardless of the type or manufacturer of the component. This control may include the determination of the status of the component's restraints (engaged vs. disengaged). The vehicle restraint module may not allow a vehicle test or procedure to initiate unless the component's vehicle restraint system is properly engaged. Furthermore, universal controller 104*a* may include a vehicle restraint manual bypass switch to facilitate removal of a vehicle from a vehicle restraint system in case of system failure. This manual bypass switch may be mounted on the exterior of a controller cabinet or at another convenient location for ease of access.

According to one aspect of the invention, universal controller 104*a* may include an emergency stop module. The emergency stop module may enable emergency shutdown of an active component procedure in an emergency situation. For example, the emergency stop module may enable the shutdown of a dynamometer by applying sufficient PAU loading and/or application of the roll brake to rapidly reduce a vehicle's speed to zero. An emergency stop may be invoked by a computer command from universal controller 104*a* (initiated by a user or upon the occurrence of predetermined emergency parameters) or by the activation of an emergency stop button switch. The emergency stop button switch may be located on the outside of the controller cabinet or in a remote location (providing faster user access).

According to one aspect of the invention, universal controller 104*a* may include a vehicle lift control module. The vehicle lift control module may enable the automatic control of a component's vehicle lift system. A dynamometer, for example, may include a lift system for lifting vehicle tires into and out of dynamometer rolls. The vehicle lift control module may determine the status of the vehicle lift system (up, down, or gradations in between) and may control lift status. Additionally, universal controller 104*a* may include a vehicle lift manual bypass switch to facilitate removal of a vehicle in case of system failure. The vehicle lift manual bypass switch may be mounted on the exterior of a controller cabinet or at another convenient location for ease of access.

According to one aspect of the invention, universal controller 104*a* may include a diagnostic module. The diagnostic module may identify internal faults and errors of universal controller 104*a* and of operatively connected components. The diagnostic module may log these faults and errors and display them to a user. Some of the faults that the diagnostic module may report may include, for instance, controller high or low voltage out of range, CPU fault, I/O board fault, motor faults, motor over temp, air pressure out of range, load cell fault, horsepower/torque out of range, dynamometer component temperature out of range, or other messages. As would be apparent to those having ordinary skill in the art, different error messages may exist for different types and brands of components. Furthermore, the diagnostic module may run a self check of the universal controller 104*a*'s internal components and on controlled components. A log containing a report of faults or errors may be created and stored.

According to one aspect of the invention, universal controller 104*a* may include a warning beacon. The warning beacon may, for example, include a light mounted on universal controller 104*a* or controller cabinet that, when activated by the diagnostic module, may flash and warn users when faults or errors are detected. Alternatively, the warning beacon may include a graphical signal on a graphical user interface of universal controller 104*a*.

According to one aspect of the invention, universal controller 104*a* may include an augmented braking module. The augmented braking module may enable universal controller 104*a* to apply augmented breaking of a vehicle undergoing testing on a dynamometer on major decelerations over 2 MPH per second or other value as specified by a chosen drive cycle. Augmented breaking may be actuated when negative force applied by a vehicle at a dynamometer roll surface is greater than 110 pounds or other predetermined force. If augmented breaking is not linked to driver breaking, the vehicle driver may be signaled to refrain from accelerating the vehicle during this period.

According to one aspect of the invention, universal controller 104*a* may include a speed synchronization module. The speed synchronization module may monitor a speed signal from front and rear speed sensors of a dynamometer. If synchronization between the front and rear speed sensors is greater than ±0.1 MPH (or other predetermined value), the speed synchronization module may alert a user by causing an error message to be displayed.

According to one aspect of the invention, universal controller 104*a* may include a radio frequency (RF) remote control device. This remote control device may enable an operator to start, stop, perform emergency stop, or perform other necessary or convenient functions associated with various components. The remote control device may enable these functions to be performed from a location remote from, but nearby to, universal controller 104*a*, for example, inside vehicle being tested/repaired.

According to one aspect of the invention, control application 140 may include a report module. The report module may provide reports regarding vehicle testing and/or vehicle test results to one or more entities. For example, the report module may provide reports to a government or regulatory entity, such as, a state or national Department of Motor Vehicles (DMV). In another example, the report module may provide reports to vehicle owners, testing facilities, corporations, consumer groups, vehicle or automotive parts manufacturers, educational facilities, or other entities. In one embodiment, the report module may provide reports in one or more formats such as, for example, via e-mail, fax, printouts, text-message, voice message, or other format. In one embodiment, the report module may provide or post reports to a web site, which may be accessed by one or more entities. In one embodiment, report module may utilize a communications port (for example, communications port 170 of FIG. 1B) and/or a network (for example, network 185 or network 187 of FIG. 1B) to provide reports to one or more entities in one or more formats.

Figure 5:
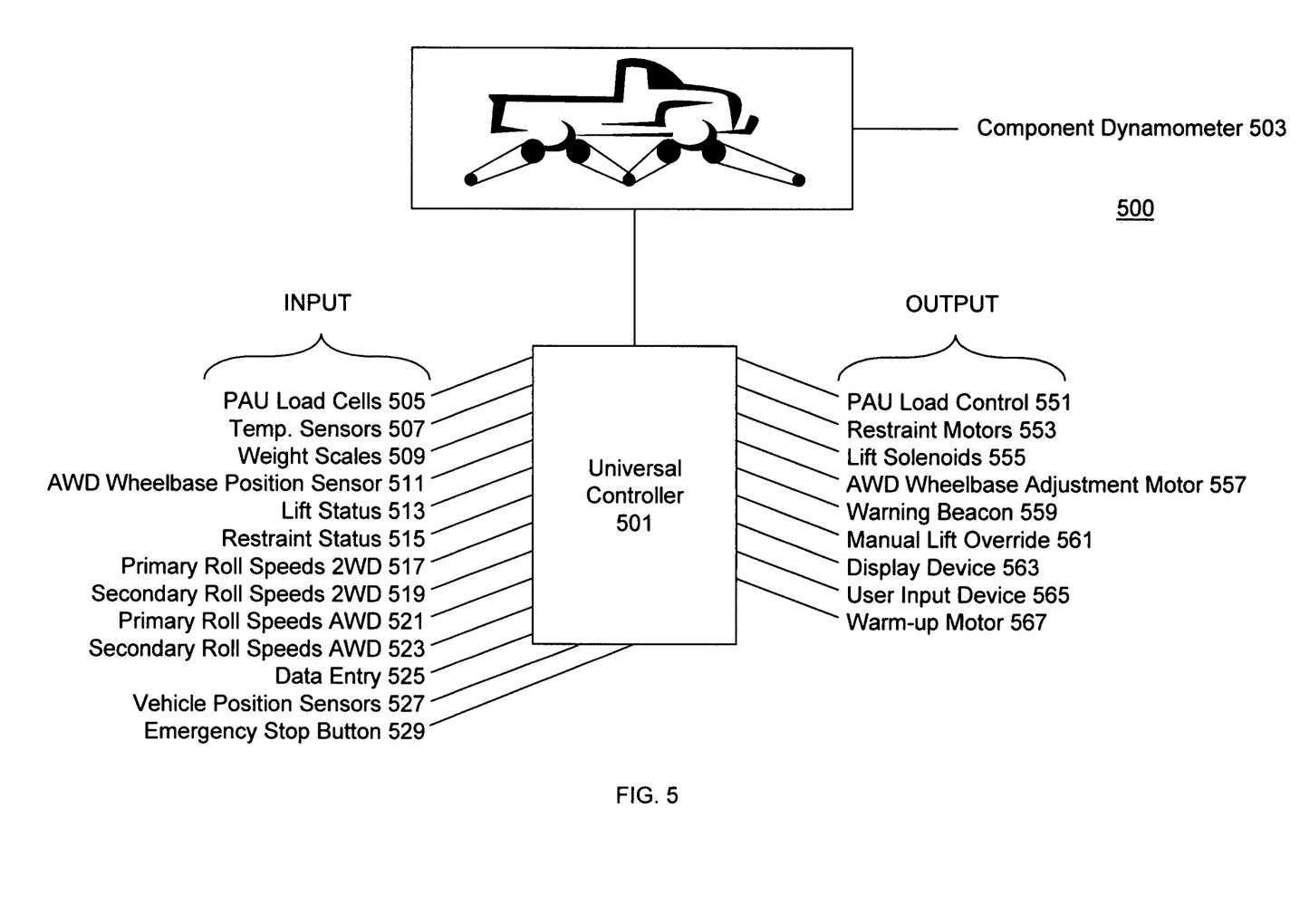
FIG. 5 illustrates a schematic diagram of a universal controller including numerous inputs and outputs, according to an embodiment of the invention.

According to one aspect of the invention illustrated in FIG. 5, a system 500 is provided for a universal controller 501 that is operatively connected to a dynamometer 503 as a component. System 500 may include various inputs, for instance, PAU load cells 505, temperature sensors (PAU bearings, frame) 507, weight scales 509, all wheel drive (AWD) wheelbase position sensor 511, lift status 513, restraint status 515, primary (front) roll speeds two wheel drive (2WD) 517, secondary (rear) roll speeds 2WD 519, primary roll speeds AWD 521, secondary roll speeds AWD 523, data entry 525, vehicle position sensors 527, emergency stop button 529, or other input.

System 500 may also include various outputs, for instance, PAU load control 551, restraint motor(s) 553, lift solenoid(s) 555, AWD wheelbase adjustment motor 557, warning beacon 559, manual lift override 561, display device 563 (for instance, VGA), user input device 565 (for instance PS2), warm up motor 567, or other outputs. In the exemplary illustration of FIG. 5, a dynamometer is included as a component. However, other types components may be used, and inputs and outputs may vary accordingly.

According to one aspect of the invention, universal controller 104*a* may include a data analysis module. The data analysis module may gather test data returned by a specific component, store the data on a hard disk or other data storage device, process the data, and report test results regardless of the type or manufacturer of the component. Processed test results may then be stored on a hard disk or other data storage device. In some embodiments, universal controller 104*a* may include, interface to, or otherwise be associated with a printer or similar device capable of creating printed documents for printing test results or other data.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

We claim:

1. A computer-implemented universal automotive maintenance component controller apparatus, wherein the apparatus serves as the common-core of a modular vehicle maintenance and diagnostic system, the apparatus comprising:

a processor;

one or more component interfaces operatively connected to the processor, wherein each of the one or more component interfaces is configured to interface with a particular automotive maintenance component;

a control application including one or more software modules enabling the processor to control one or more connected automotive maintenance components; and one or more electrical outlet receptacles for providing electrical power to one or more of the one or more connected automotive maintenance components.

2. The apparatus of claim 1, further comprising a graphical user interface, a display device, and a user input device, wherein the graphical user interface enables user control of a connected automotive maintenance component, and wherein the display device and the user input device enables a user to interact with the graphical user interface.

3. The apparatus of claim 2, wherein the display device includes an LCD screen enabling the display of one or more menus to the user, and wherein the user input device includes a digital keypad enabling the user to scroll through and select items from the one or more menus.

4. A computer-implemented universal automotive maintenance component controller apparatus, wherein the apparatus serves as the common-core of a modular vehicle maintenance and diagnostic system, the apparatus comprising:

a processor;

one or more component interfaces operatively connected to the processor, wherein each of the one or more component interfaces is configured to interface with a particular automotive maintenance component;

a control application including one or more software modules enabling the processor to control one or more connected automotive maintenance components; and wherein at least one of the one or more connected automotive maintenance components is a dynamometer, and wherein the one or more software modules include an augmented braking module that applies augmented braking to a vehicle undergoing testing on the dynamometer.

5. A computer-implemented universal automotive maintenance component controller apparatus, wherein the apparatus serves as the common-core of a modular vehicle maintenance and diagnostic system, the apparatus comprising:

a processor;

one or more component interfaces operatively connected to the processor, wherein each of the one or more component interfaces is configured to interface with a particular automotive maintenance component;

a control application including one or more software modules enabling the processor to control one or more connected automotive maintenance components; and wherein at least one of the one or more connected automotive maintenance components is a dynamometer, and wherein the one or more software modules include a speed synchronization module to monitor a speed signal from front and rear speed sensors of the dynamometer and alert a user if synchronization between the front and rear speed sensors exceeds a predetermined threshold.

6. A computer-implemented universal automotive maintenance component controller apparatus, wherein the apparatus serves as the common-core of a modular vehicle maintenance and diagnostic system, the apparatus comprising:

a processor;

one or more component interfaces operatively connected to the processor, wherein each of the one or more component interfaces is configured to interface with a particular automotive maintenance component;

a control application including one or more software modules enabling the processor to control one or more connected automotive maintenance components; and wherein the one or more software modules include a vehicle position module that calculates a vehicle position in a vehicle maintenance environment.

7. A computer-implemented universal automotive maintenance component controller apparatus, wherein the apparatus serves as the common-core of a modular vehicle maintenance and diagnostic system, the apparatus comprising:

a processor;

one or more component interfaces operatively connected to the processor, wherein each of the one or more component interfaces is configured to interface with a particular automotive maintenance component;

a control application including one or more software modules enabling the processor to control one or more connected automotive maintenance components; and wherein the one or more software modules include a vehicle restraint module that controls vehicle restraint equipment of a connected automotive maintenance component.

8. A computer-implemented universal automotive maintenance component controller apparatus, wherein the apparatus serves as the common-core of a modular vehicle maintenance and diagnostic system, the apparatus comprising:

a processor;

one or more component interfaces operatively connected to the processor, wherein each of the one or more component interfaces is configured to interface with a particular automotive maintenance component;

a control application including one or more software modules enabling the processor to control one or more connected automotive maintenance components; and wherein the one or more software modules include an emergency stop module that enables an emergency shut down of a connected automotive maintenance component.

* * * * *